United States Patent [19]

Griffin et al.

[11] Patent Number: 5,071,174
[45] Date of Patent: Dec. 10, 1991

[54] BRAZED TUBING CONNECTOR CONSTRUCTION AND METHOD

[75] Inventors: Gary E. Griffin, Penn Yan, N.Y.; David C. Clark, Columbus, Ohio

[73] Assignee: Parker-Hannifin Corporation, Cleveland, Ohio

[21] Appl. No.: 600,388

[22] Filed: Oct. 18, 1990

[51] Int. Cl.$^5$ ............................................. F16L 55/00
[52] U.S. Cl. .................................... 285/173; 285/187; 285/287; 285/416; 228/251; 228/263.16
[58] Field of Search ............... 285/173, 416, 286, 287, 285/187; 228/245, 246, 251, 263.16, 263.18

[56] References Cited

U.S. PATENT DOCUMENTS

| | | | |
|---|---|---|---|
| Re. 27,709 | 7/1973 | Holmgren | 285/416 X |
| 2,353,466 | 7/1944 | Heintz et al. | 228/245 X |
| 2,453,331 | 11/1948 | Martin | 285/286 X |
| 3,858,911 | 1/1975 | Martin | 285/173 |

FOREIGN PATENT DOCUMENTS

| | | | |
|---|---|---|---|
| 794736 | 9/1968 | Canada | 285/173 |
| 2549282 | 5/1977 | Fed. Rep. of Germany | 285/416 |

Primary Examiner—Dave W. Arola
Attorney, Agent, or Firm—Ralph E. Jocke

[57] ABSTRACT

In a construction for joining a copper tube (20) to a steel body (10) which may be part of a device such as an accumulator used in an air conditioning system, the copper tube is passed into an opening (14) in a wall (12) of the steel body. The opening in the steel body is bounded by a neck projection (18) which extends outward therefrom. A copper collar (24) includes a first portion (26) which accepts neck projection (18) of the steel body. A second portion (28) of the copper collar (24) accepts the copper tube. A mass (34) of brazing material is positioned in the collar in a tapered transitional portion (30) between the first and second portions of the collar. When the body, tube and collar are assembled and placed in a brazing furnace, the brazing material melts and flows by capillary action between the first portion of the collar and the outside of the neck projection of the steel body. The brazing material also flows between the second portion of the collar and the tube. Upon cooling, the brazing material forms a strong, fluid-tight weld which joins the body and the tube.

8 Claims, 2 Drawing Sheets

BRAZED TUBING CONNECTOR CONSTRUCTION AND METHOD

TECHNICAL FIELD

This invention relates to connectors for tubes. Particularly this invention relates to a brazed connector for joining a tube made of one material, to a body made of a second material which has a different coefficient of thermal expansion. Such connectors are typically used in refrigeration systems to join copper tubing which carries refrigerant, to devices in the system, such as an accumulator which is made of steel.

BACKGROUND ART

Refrigeration systems typically include several components, such as an evaporator, a condenser, an accumulator, a compressor and an expansion valve. It is common to conduct refrigerant between these devices in copper tubing. Copper tubing is often used in refrigeration systems because it is compatible with conventional refrigerants and may be readily cut and brazed in the field. The ability to make reliable, fluid-tight connections by brazing in the field is important as it insures that the refrigerant will not escape from the system through small openings or flaws in the brazed connections.

In many instances, the devices in the refrigeration system are made of steel. Therefore, the copper tubes which carry the refrigerant must at some point be placed in connection to a steel body. This may be done using threaded connectors or other types of adapters, however, such approaches are more expensive than brazing.

Connecting copper tubing to a steel body by brazing has often proven difficult because copper has a greater coefficient of thermal expansion than steel. When copper and steel materials are heated during brazing, the copper will expand locally much more than the steel. Similarly, upon cooling, the copper will contract more than the steel, resulting in relative dimensional changes. These differences in the rates of expansion and contraction may result in cracks in the brazing material. If the brazing is done at a connection in a refrigeration system, such cracks may result in a refrigerant leak. This is significant not only because lost refrigerant may disable the system, but also because many refrigerants cause problems which damage the environment.

To facilitate the installation of refrigeration systems in the field, steel components may be equipped with a section of copper tubing already attached to the component. In this way, the component may be readily connected using copper- to copper brazed connections. The welding of copper tubing to a steel body has been previously done by extending a copper tube through a slightly larger hole in an outer wall of the steel body of the device. A pre-formed mass of brazing material is placed in close proximity to the intersection of the body and the tube, and the assembly passed through a brazing furnace. In the furnace, the brazing material melts and flows into the space between the outside of the tube and the hole. Upon cooling, the film of brazing material in the space solidifies resulting in the tube and steel body being welded together.

There are two common problems with this approach to attaching a copper tube to a steel component. First, because the hole in the steel body must be slightly larger than the outside of the tube, the tube cannot always be made to extend at a right angle to the body. This is particularly true if the welding is attempted with the tube extending in a horizontal position. This problem can be reduced if the welding is done with the tube in the vertical position, however this is often not feasible. Attempts at furnace brazing with the tube extending horizontally, may result in the tube extending from the body at a random angle. When the steel component is installed in the field, the refrigerant-carrying tube will have to be connected to the tube section attached to the body at this random angle. Otherwise, the tubing will have to be bent to make the connection. This increases the difficulty involved in installing the component in the field, or if the tubing is bent, risks damaging the fragile film of brazing material holding the tube and the body together.

A further problem with furnace brazing using the approach previously discussed, occurs when the hole in the steel body is too close in size to the outer diameter of the tube. While keeping the hole in the steel body and the tube in close tolerance helps to support the tube during brazing in a horizontal position, it causes another problem. There is little space between the outside of the tube and the inside of the hole to begin with, and heating during brazing causes the tube to expand more than the hole. This reduces the space through which brazing material may flow. As a result, little or no brazing material enters the critical area between the outside of the tube and the hole to form the weld. This results in weak or imperfect joint which may ultimately leak.

Thus, there exists a need for a brazed joint construction that may be used to attach a copper tube to a steel body in the horizontal position in a manner that insures that the tubing will be in a desired alignment, and which provides a reliable, fluid tight connection between the tube and the body.

DISCLOSURE OF INVENTION

It is an object of the present invention to provide a construction for joining a fluid conduit made of a material having a first coefficient of thermal expansion, to an opening in a body made of another material having a second coefficient of thermal expansion less than that of the material from which the conduit is made, that is more reliable in providing a fluid-tight connection.

It is a further object of the present invention to provide a construction for joining a fluid conduit made of a material having a first coefficient of thermal expansion, to an opening in a body made of another material having a second coefficient of thermal expansion less than that of the material of which the conduit is made, that is less expensive to produce.

It is the further object of the present invention to provide a construction for joining a fluid conduit made of a material having a first coefficient of thermal expansion, to an opening in a body made of another material having a second coefficient of thermal expansion less than that of the material of which the conduit is made, that can be brazed with a conduit in a desired alignment with the body.

It is a further object of the present invention to provide a construction for a brazed joint for connecting a copper tube to a steel body.

It is a further object of the present invention to provide a method for joining a fluid conduit made of a material having a first coefficient of thermal expansion, to a body made of another material having a second coefficient of thermal expansion less than that of the material from which the conduit is made, so as to provide a reliable fluid-tight connection.

Further objects of the present invention will made apparent in the following description of the Best Modes for Carrying Out Invention in the appended Claims.

The foregoing objects are accomplished by a joint construction for joining a copper tube to an opening in a steel body. The copper tube extends into the opening in the body. A neck projection extends outward from the body about the periphery of the opening.

A copper collar extends over the tube and neck projection. A first sleeve portion of the collar overlaps the outside of the neck projection so that the neck projection is positioned between the outside of the tube and the first sleeve portion of the collar. A second sleeve portion of the collar disposed away from the body overlaps the outside of copper tube in close proximity thereto. The copper collar also includes a taper transition portion between the two sleeve portions. The tapered transition portion provides an open cavity inside the collar between the sleeve portions when the collar is positioned on the tube and the body.

When it is desired to braze the copper tube to the steel body, the tube is extended through the collar and a mass of brazing material placed in the cavity inside of the tapered transition portion. The tube is then extended into the opening in the body, and the first sleeve portion of the collar placed over the neck projection.

Upon heating of the body and tube in a brazing furnace, the first sleeve portion of the copper collar expands more than the neck projection on the steel body. The mass of brazing material melts, and flows by capillary action between the space between the collar and neck projection. The melted brazing material also flows into the space between the second sleeve portion of the collar and the outside of tube. During heating, the tube is held by the collar in alignment with the neck projection and the opening, which insures that it is at a proper angle with respect to the body.

Upon cooling of the body and tube, the brazing material solidifies and the components slightly contract. As the diameter of the first sleeve portion of the collar contracts more than the neck projection of the steel body, the film of brazing material that has flowed between them is placed in compression. As the brazing material is in slight compression, it is less likely to crack or develop flaws as it cools. Of course, the copper collar and tube are also held together by the brazing material which has flowed between the second sleeve portion and tube. As a result, a reliable, fluid-tight connection is made between the steel body and the copper tubing.

BRIEF DESCRIPTIONS OF DRAWINGS

BEST MODES FOR CARRYING OUT INVENTION

Figure 1:
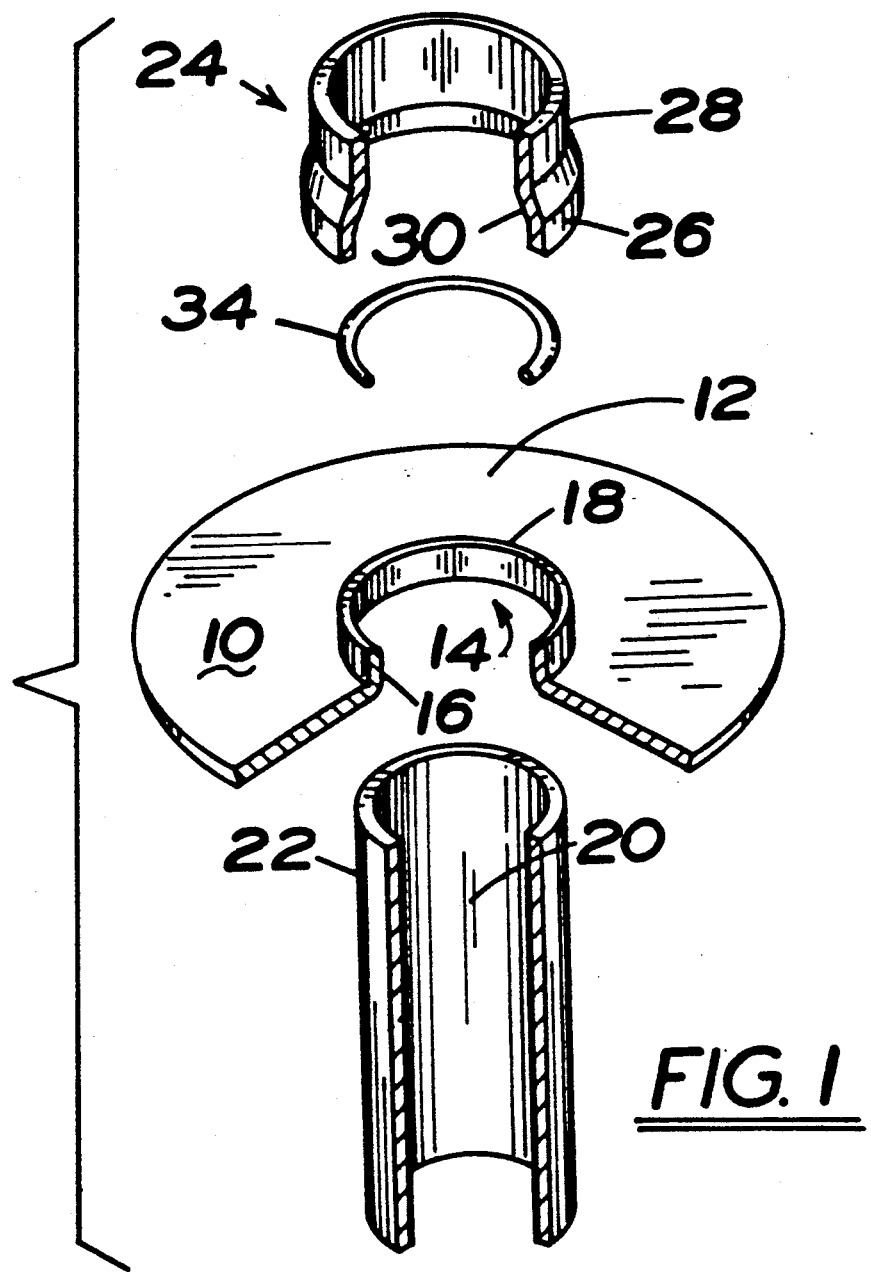
FIG. 1 is an exploded, partially sectioned view of the joint construction of the present invention.

Referring now to the drawings and particularly to FIG. 1, there is shown therein an exploded and partially sectioned view of the preferred form of the joint construction of the present invention. A steel body 10, only a small portion of which is shown, includes a wall 12. Wall 12 has a circular opening 14 therethrough. Opening 14 is bounded by an inside perimeter 16. A circular neck projection 18 extends from wall 12 about the perimeter of opening 14.

Figure 2:
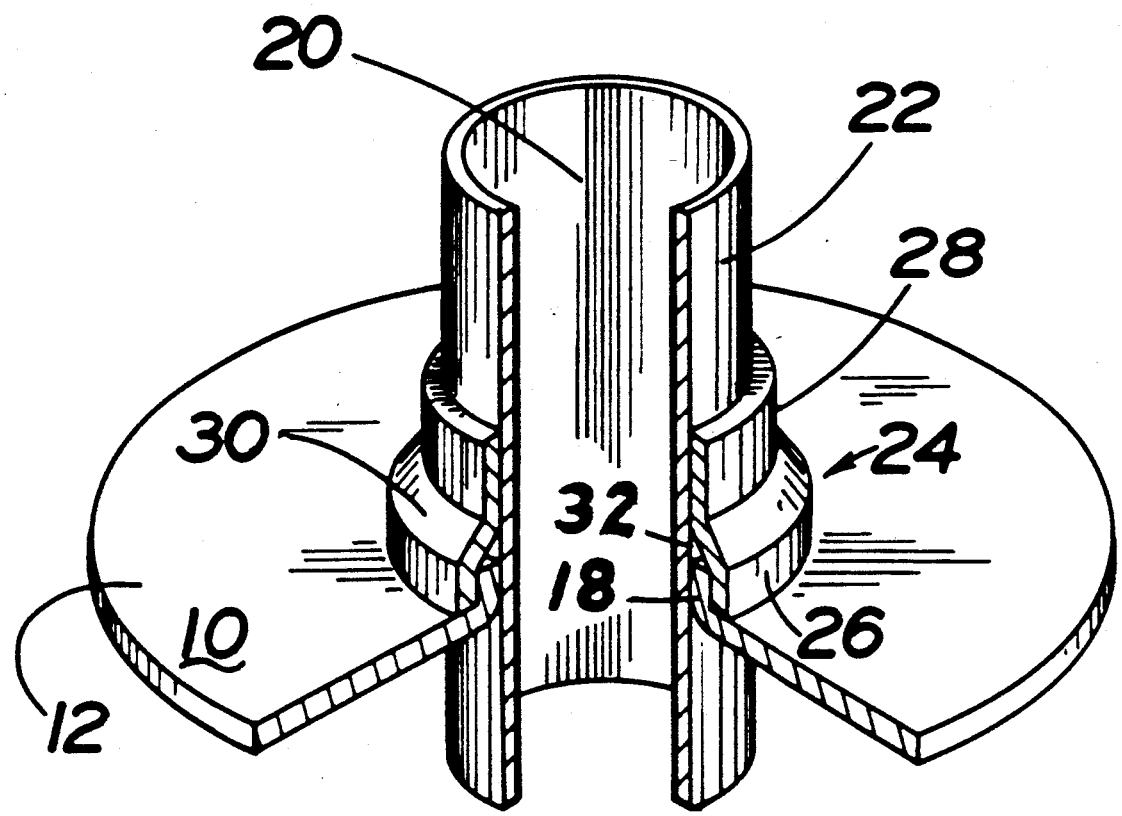
FIG. 2 is a partially sectioned view of the joint construction of the present invention.

A copper tube 20 extends through opening 14 in the wall when the joint construction is assembled (see FIG. 2). Tube 20 has an outside surface 22 which is sized to be slightly smaller than opening 14 in wall 12.

A copper collar 24 extends over the outside of tube 20 and neck projection 18. Collar 24 includes a first sleeve portion 26 and a second sleeve portion 28. First sleeve portion 26 is sized to accept neck projection 18 in close fitting relation. Second sleeve portion 28 of collar 24 is sized to accept the outside surface 22 of tube 20 in close fitting relation. Collar 24 serves to support tube 20 in opening 14 and holds it perpendicular to wall 12.

The sleeve portions of collar 24 are connected by a tapered transition portion 30. As shown in FIG. 2, the inside of tapered transition portion 30, neck projection 18, and the outside surface of the tube 22, bound a cavity 32. When the joint construction is assembled prior to brazing, a pre-formed mass 34 of brazing material is positioned in cavity 32. Mass 34 may be a conventional type of brazing solder, such as 45 percent silver braze. In the preferred form of the invention, mass 34 is formed as a circular ring so that it may be readily fit over the tube. However in other constructions, other shapes may be used.

In making the joint construction of the preferred form of the present invention, tube 20 is extended through opening 14 in wall 12. Although in the drawings tube 20 is shown extending all the way through the opening in the wall, in other embodiments, the fluid conduit, need not extend completely through the wall. Likewise, in other embodiments of the invention, the fluid conduit need not be round. It could be square, or have another shape, depending on the application.

In forming the joint, the mass 34 of brazing material is positioned inside the tapered transitional portion 30 of the collar 24, and the collar is slid over tube 20. First sleeve portion 26 is passed over neck projection 18 so that the projection is positioned between the outside of the tube and the collar. When this is done, the collar automatically aligns itself with the neck projection and the opening 14 because the first sleeve portion is closely sized to the neck projection. Similarly, because the second sleeve portion 28 of the collar is closely sized to the outside of tube 20, the second sleeve portion holds the tube in alignment with the opening 14 in the wall.

When the tube and body are placed in a brazing furnace, the copper collar and tube expand upon heating much more than the neck projection and the opening in the steel body. This is because copper has a coefficient of thermal expansion that is greater than steel. As a result, the clearance between the first sleeve portion of the collar and the neck projection increases. However, despite this slight increase, the neck projection continues to support the collar and tube to hold them in position.

When the temperature of the assembly reaches the point at which the mass of brazing material melts, the brazing material travels by capillary action from cavity 30 to areas between neck projection 18 and the inside of first sleeve portion 26. Brazing material also flows between the second sleeve portion 28 and the outside surface 22 of the tube 20. Brazing material may also travel between the outside surface of the tube and the perimeter 16 of the opening 14 in the steel body.

When the assembly is cooled, the film of brazing material between the respective components solidifies.

Cooling of the collar 14 causes first sleeve portion 24 to contract faster than neck projection 18. This results in the film of brazing material located between the first sleeve portion and the neck projection being placed in compression. The fact that the brazing material solidifies under compression makes it more likely to form a solid, fluid-tight weld.

Any brazing material between perimeter 16 of opening 14 and the outside of tube 20 solidifies in tension due to the different rates of contraction. This results in a weld in this area that is less likely to be a good, fluid-tight connection. However, it does not matter if the brazed connection in the area between the perimeter of the opening and the outside of the tube is imperfect, because the weld between the first portion of the collar and the neck connection creates a fluid-tight connection between the neck projection on the body and the collar.

The brazing material between the second sleeve portion 28 of the collar and the tube, as well as brazing material which remains in cavity 30, solidifies upon cooling to hold the collar and tube in fluid-tight relation. This brazing material does not experience any unusual force as it solidifies because both the collar and tube are made of copper and contract upon cooling at the same rate. The brazing material between the collar and the tube forms a fluid-tight seal and prevents the escape of any material which may pass into the cavity as the result of an imperfect weld at the perimeter of the opening in the wall and the outside of the tube.

The present invention provides a reliable, fluid-tight brazed joint connection between a copper tube and a steel body which may be formed in a brazing furnace. In addition, the invention provides for the copper tubing to be joined at the steel body in a predetermined alignment normal to the body so that connections to other tubes may be readily made in the field.

It will be apparent to those skilled in the art that the construction of the present invention may be also be used successfully with other materials as well, provided that the coefficients of thermal expansion of the materials used for the collar and tube are greater than the coefficient of expansion of the material of the body. Similar results may also be obtained if the collar and tube are of different materials provided that the coefficient of thermal expansion of the collar is greater than that of the body material or tube material.

Thus, the new tubing connector construction and method achieves the above-stated objectives, eliminates difficulties encountered in the use of prior devices, solves problems, and obtains the desirable results described herein.

In the foregoing description certain items have been used for brevity, clarity and understanding, however, no unnecessary limitations are to be implied therefrom because such terms are for descriptive purposes and are intended to be broadly construed. Moreover the descriptions and illustrations are by way of examples and the invention is not limited to the details shown and described.

Having described the features, discoveries and principles of the invention, the manner in which it is constructed and operated, and advantages and useful results obtained; the new and useful structures, devices, elements, arrangements, parts, calculations, systems, equipment, operations and relationships are set forth in the appended claims.

We claim:

1. A joint construction joining a fluid conduit, said conduit comprised of a first material having a first coefficient of thermal expansion, in fluid communication to a body comprised of a second material having a second coefficient of thermal expansion, said first coefficient of thermal expansion greater than said second coefficient of thermal expansion, comprising:
   a body, said body including an opening, said opening having a perimeter, said conduit extending into said opening;
   a neck projection on said body, said neck projection extending outward of said body adjacent the perimeter of said opening;
   a collar comprised of said first material, said collar including:
      a first sleeve portion adjacent and overlapping said neck projection, said neck projection disposed between said first sleeve portion of said collar and said conduit;
      a second sleeve portion adjacent and overlapping said conduit; and
      a cavity, said cavity in communication with said first sleeve portion and said second sleeve portion,
   and a mass comprising brazing material, said mass positioned in said cavity,
   whereby upon heating, said collar supports said conduit while said brazing material is enabled to flow between said first sleeve portion and said neck projection, and said second sleeve portion and said conduit, to hold said body and conduit in fixed, fluid tight relation upon cooling.

2. A joint construction joining a fluid conduit, said fluid conduit comprised of a first material having a first coefficient thermal expansion, in fluid communication to a body comprised of the second material having a second coefficient of thermal expansion, said first coefficient of thermal expansion greater than said second coefficient of thermal expansion, comprising:
   a body, said body including an opening, said opening having a perimeter, said conduit extending into said opening;
   a neck projection on said body, said neck projection extending outward of said body adjacent the perimeter of said opening;
   a collar comprised of a third material, said third material having a coefficient of thermal expansion greater than said second coefficient of thermal expansion, said collar including:
      a first sleeve portion adjacent and overlapping said neck projection, said neck projection disposed between said first sleeve portion of said collar and said conduit;
      a second sleeve portion adjacent and overlapping said conduit; and,
      a cavity, said cavity in communication with said first sleeve portion and said second sleeve portion,
   and a mass comprising brazing material, said mass positioned in said cavity,
   whereby upon heating, said collar supports said conduit while said brazing material is enabled to flow between said first sleeve portion and said neck projection, and said second sleeve portion and said conduit, to hold said body and conduit in fixed, fluid tight relation upon cooling.

3. A joint construction for holding a copper fluid conduit to a steel body, comprising:

a steel body, said body including an opening, said opening having a perimeter, said conduit extending into said opening;

a neck projection on said body, said neck projection extending outward of said body adjacent the perimeter of said opening;

a copper collar, said collar including:
  a first sleeve portion adjacent and overlapping said neck projection, said neck projection disposed between said first sleeve portion of said collar and said conduit;
  a second sleeve portion adjacent and overlapping said conduit; and,
  a cavity, said cavity in communication with said first sleeve portion and said second sleeve portion,
  a mass comprising brazing material, said mass positioned in said cavity, whereby upon heating, said collar supports said conduit while said brazing material is enabled to flow between said first sleeve portion and said neck projection and between said second sleeve portion and said conduit, to hold said body and conduit, in fixed, fluid tight relation upon cooling.

4. The joint construction according to claim 3 wherein said opening is a circular opening, and said fluid conduit is a circular tube having an outer wall, said outer wall adjacent to said neck projection.

5. The joint construction according to claim 4 wherein said first and second sleeve portions of said collar are cylindrical and said collar further includes a tapered transition portion between said sleeve portions, said cavity bounded by an inside wall of said collar in said tapered transition portion.

6. The joint construction according to claim 5 wherein said mass is formed in the shape of a circular ring, said tube extending through said ring.

7. A method for joining a fluid conduit comprised of a first material having a first coefficient of thermal expansion, in fluid communication to a body comprised of a second material having a second coefficient of thermal expansion, said first coefficient of thermal expansion greater than the second coefficient of thermal expansion, said body including an opening for accepting said fluid conduit, and a neck projection, said neck projection extending outward of said body adjacent said opening; said method comprising the steps of:

a) extending said fluid conduit into said opening;

b) placing a mass comprising brazing material adjacent said neck projection and said conduit;

c) placing a collar comprised of said first material on said neck projection and conduit, said collar including:
  a first sleeve portion adjacent and overlapping said neck projection, said neck projection disposed between said first sleeve portion of said collar and said conduit;
  a second sleeve portion adjacent and overlapping said conduit;
  a cavity, said cavity in communication with said first sleeve portion and said second sleeve portion, said cavity accepting said mass, d) heating said collar, neck projection and fluid conduit to enable said brazing material to flow between said first sleeve portion and said second neck projection and said second sleeve portion and said conduit; and e) cooling said collar, neck projection and fluid conduit to solidify said brazing material whereby said body and conduit are joined in fixed, fluid tight relation.

8. The method according to claim 7 wherein said opening is a circular opening, said fluid conduit is a circular tube, said first and second sleeve portions of said collar are cylindrical, and said mass has a ring shape, said conduit being passed through said ring.

* * * * *